(12) United States Patent
Fresch et al.

(10) Patent No.: US 7,000,332 B1
(45) Date of Patent: Feb. 21, 2006

(54) PULSE PURGE REGENERATIVE GAS DRYER

(75) Inventors: Vincent P Fresch, Elm Grove, WI (US); Titus A. Mathews, Kenosha, WI (US)

(73) Assignee: Pneumatech, Inc., Kenosha, WI (US)

( * ) Notice: Subject to any disclaimer, the term of this patent is extended or adjusted under 35 U.S.C. 154(b) by 0 days.

(21) Appl. No.: 11/100,165

(22) Filed: Apr. 6, 2005

(51) Int. Cl.
  *F26B 3/00* (2006.01)

(52) U.S. Cl. .......................... 34/330; 34/343; 34/473; 95/98; 95/122; 95/123

(58) Field of Classification Search ................. 34/330, 34/332, 343, 345, 473, 80; 95/98, 117–123
See application file for complete search history.

(56) References Cited

U.S. PATENT DOCUMENTS 4,738,692 A    4/1988  Fresch et al.
5,485,686 A *  1/1996  Sears, Jr. ..................... 34/473
6,729,039 B1 * 5/2004  Crawford ..................... 34/343

* cited by examiner

*Primary Examiner*—Jiping Lu
(74) *Attorney, Agent, or Firm*—Andrus, Sceales, Starke & Sawall, LLP

(57) ABSTRACT

A gas drying apparatus is provided having at least two desiccant-containing towers which alternately receive moisture-saturated air from an inlet to be dried during a drying phase, and then receive dry air during a regeneration phase to regenerate the desiccant which had previously adsorbed moisture from saturated air during the drying phase. The apparatus diverts a portion of dry air flowing along one of two flow paths including a first flow path having a heater and a pulse purge regeneration control valve for selectively enabling delivery of heated dry air to the tower being regenerated, and a second flow path which bypasses the first flow path and includes a bypass valve for selectively permitting delivery of unheated dry air to the tower being generated so as to cool the desiccant therein. A temperature sensing arrangement is provided for monitoring and maintaining the internal temperature of heated dry air delivered into the tower being regenerated.

5 Claims, 1 Drawing Sheet

PULSE PURGE REGENERATIVE GAS DRYER

FIELD OF THE INVENTION

This invention relates generally to a twin tower gas drying apparatus and, more particularly, pertains to a heated twin tower gas drying apparatus which uses an enhanced pulse purge regeneration design which is quieter and more energy efficient than previous devices.

BACKGROUND OF THE INVENTION

The presence of moisture in gases leads to difficulties in many industries and operations. With a slight drop in temperature, condensation can occur in pipelines and reservoirs which can lead to corrosion, scales, freeze-ups, dirt, etc. which may damage instruments and controls and cause blockages in airlines, produce excessive pressure drops, increase down-time and reduce the life of tools. Similarly in chemical, food and metal working industries, the presence of moisture in the air and gases produces undesired oxidation. It has also been found that the robotics field requires extremely dry air for the operation of its pneumatic systems.

In order to produce extremely dry air i.e., dew points of minus 40 degrees Fahrenheit or lower, it is necessary to use an adsorptive drying system. Typically, adsorption drying is done by means of twin towers filled with a desiccant. The basis for the twin tower adsorption method is that while one tower is receiving moisture laden air for drying, the other tower is having its desiccant regenerated by passing dry air through that tower. In the past, this regeneration process has been accomplished by taking a portion of the dry air exiting the tower in the drying cycle and passing this air through the other tower to absorb moisture from the desiccant in that tower and thus regenerate that desiccant. Historically, a larger than desired percentage, typically 15 percent, of the dry air exiting the tower in the drying cycle was utilized to regenerate the other tower. This method has the obvious disadvantage of diverting 15 percent away from its end use in order to utilize it for regenerating one of the towers.

U.S. Pat. No. 4,738,692 issued Apr. 19, 1988 to Fresch, et al., discloses a pulse purge gas drying apparatus that markedly reduces the undesirably high percentage of dry air diverted to the regeneration tower. In the '692 patent, the gas drying apparatus includes purge outlet valves which release the air used for regeneration of the desiccant into the atmosphere, and controls for the purge outlet valves that alternately open and close or pulse the purge outlet valves during regeneration. As a result, the tower being regenerated is alternately pressurized and depressurized so that the amount of air released through the purged outlet valve is limited without causing a dew point elevation of the dry air. While prior regeneration methods used up to 15 percent of dry air generated by the drying tower, the apparatus in the '692 patent utilizes about 6 percent of the dry air generated by the drying tower.

In using the apparatus in the above described Fresch et al. patent, air flow was interrupted at the purge outlet valve, thereby allowing the regeneration tower to repressurize and hold for a predetermined time period of about 20 minutes, then depressurize after the holding time to resume purging that tower for about 20 minutes. This frequent depressurizing action creates purge loss and a momentary, extremely loud and annoying noise. In addition, when using a heater in the previously patented apparatus to accelerate regeneration of the desiccant, too much energy and time was expended in operating the heater. Subsequent cooling of the desiccant bed prior to switching the function of the towers resulted in further purge loss.

It is desirable to provide an improved heated, twin tower gas drying apparatus that rectifies the drawbacks of the prior systems by improving efficiency in purge loss and energy consumption while providing reduction in noise during operation.

SUMMARY OF THE INVENTION

It is a general object of the present invention to modify the pulse, purging and regenerating characteristics of a twin tower gas drying apparatus equipped with a heater.

It is also an object of the present invention to provide a gas drying apparatus which interrupts flow at the heater rather than the purge outlet valve.

It is a further object of the present invention to provide a gas drying apparatus which reduces the time to heat the desiccant bed in the regeneration tower.

It is an additional object of the present invention to provide a bypass line and appropriate valves around the heater to cool the desiccant bed in the regeneration tower when desired.

It is another object of the present invention to provide a gas drying apparatus which produces less noise in operation.

In one aspect of the invention, a gas drying apparatus has at least two desiccant-containing towers which alternately receive moisture-saturated air from an inlet to be dried during a drying phase, and then receive dry air during a regeneration phase to regenerate the desiccant which had previously adsorbed moisture from saturated air during the drying phase. The apparatus includes in inlet valve for each of the towers for introducing saturated air under pressure into the tower during the drying phase, and passing the saturated air over the desiccant so that the dry air exits the tower and is delivered to an outlet. A control arrangement is provided to alternately open and close each inlet valve so that only one of the towers receives saturated air during a predetermined drying phase. A purge adjusting valve is provided to divert a portion of the dry air exiting a first tower in a drying phase, and to direct the portion of the dry air to a second tower in the regeneration phase. The portion of the diverted dry air flows along one of two flow paths. A first flow path has an isolation valve, a heater and a pulse purge regeneration control valve for selectively enabling delivery of heated dry air to the second tower. The second flow path bypasses the first flow path and has a bypass valve for selectively permitting delivery of unheated dry air to the second tower so as to cool the desiccant therein. A temperature sensing arrangement is associated with the second tower for monitoring internal temperature of heated dry air delivered into the second tower such that upon reaching a predetermined desired maximum temperature of the heated dry air in the second tower, the heater is selectively energized and de-energized to maintain that desired maximum temperature. A purge outlet valve is supplied for each of the towers for releasing the air used for regeneration of the desiccant from the tower being regenerated. Each purge outlet valve is kept open by the control arrangement during the entire regeneration phase. The control arrangement operates in a first condition to close the bypass valve, open the isolation valve and alternately open and close the pulse purge regeneration valve so as to shoot incremental amounts of diverted, heated dry air into the second tower. The control arrangement operates in a second condition to close the pulse purge regeneration valve and isolation valve and de-energize the heater, and open the bypass valve so as to permit cooling of the desiccant in the second tower.

The invention further contemplates the method of drying gas in an apparatus having at least two desiccant-containing towers which alternately receive moisture-saturated air to be dried during a drying phase, and then receive dry air during a regeneration phase to regenerate the desiccant which had previously adsorbed moisture from saturated air during the drying phase. The method includes the steps of introducing saturated air into one of the towers during the drying phase and passing the saturated air over the desiccant so that the dry air exits the one tower; introducing a portion of the dry air from the one tower into the other of the towers during the regeneration phase of the other tower and passing the dry air over the desiccant which had previously adsorbed moisture during the drying phase so that the dry air absorbs moisture from the desiccant and regenerates the desiccant, the portion of the dry air flowing along one of two flow paths including a first flow path having an isolation valve, a heater and a pulse purge regeneration control valve for selectively enabling delivery of heated dry air to the other tower, and the second flow path which bypasses the first flow path and includes a bypass valve for selectively permitting delivery of unheated dry air to the other tower so as to cool the desiccant therein; supplying a control arrangement operable in a first condition to close the bypass valve, open the isolation valve and alternately open and close the pulse purge regeneration valve so as to shoot incremental amounts of diverted, heated dry air into the other tower, and operable in a second condition to close the pulse purge regeneration valve and isolation valve and de-energize the heater, and open the bypass valve so as to permit cooling of the desiccant in the other tower; and providing a sensing arrangement for monitoring internal temperature of the heated dry air delivered to the other tower such that upon reaching a predetermined desired maximum temperature of the heated dry air in the other tower, the heater is selectively de-energized and energized to maintain the desired maximum temperature.

The method includes a step of providing a purge outlet valve for each of the towers for releasing the air used for regeneration of the desiccant for the tower being regenerated. Each purge outlet valve is kept open during the entire regeneration phase. In the preferred embodiment the internal temperature of the heated dry air in the other tower is approximately a 250 degrees Fahrenheit. The method further includes the step of using about 6 percent of the total dry air generated by the one tower for introduction into the other tower.

Various other objects, features and advantages of the invention will be made apparent in the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
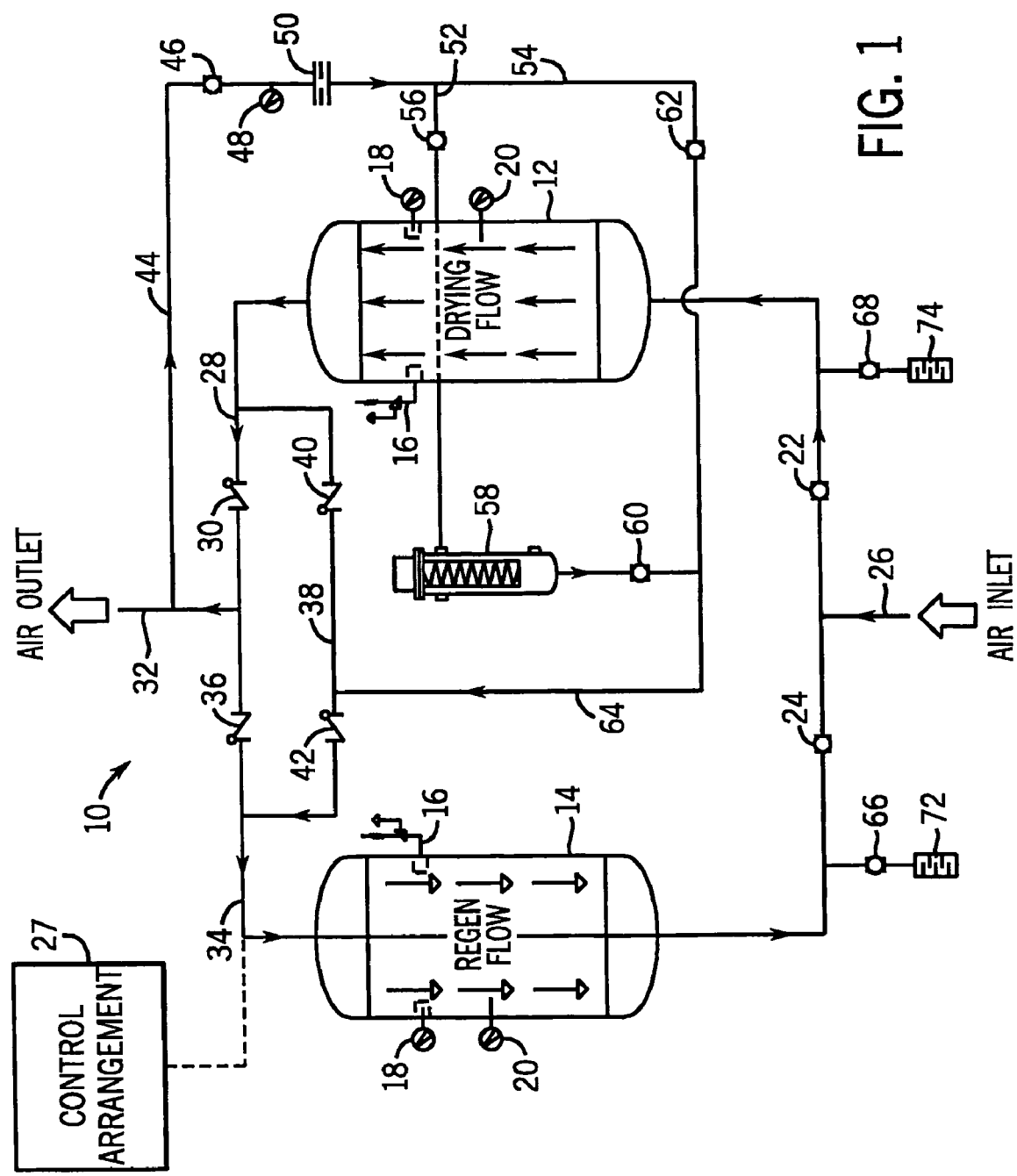
FIG. 1 is a schematic view of the gas drying apparatus embodying the present invention.

Referring now to FIG. 1, the gas drying apparatus 10 embodying the present invention includes a pair of towers 12 and 14. These towers 12, 14 contain a desiccant such as activated alumina coated with calcium chloride. The twin tower system allows one of the towers to be used for drying while the other tower is having its desiccant regenerated. Each of the towers 12, 14 is provided with a pressure relief valve 16, a pressure gauge 18, and a temperature gauge 20.

Each of the towers 12, 14 is further provided with an inlet valve 22 and 24, respectively, which when open allows saturated air entering the system at an inlet 26 to pass upwardly through one of the towers 12, 14 and the desiccant therein thus allowing the desiccant to absorb the moisture from the air.

The opening and closing of valves 22, 24 as well as the opening and closing of other valves in the system is controlled by a control arrangement 27 which by mechanical and/or electrical/electronic operation causes solenoids and actuators to time and actuate the various valves.

As dry air exits the upper portion of tower 12, it passes through a conduit 28 and unseats a one-way, air outlet check valve 30 so that the dry air may pass to and through an outlet 32. Similarly, when tower 14 is in a drying cycle, dry air exits at top of tower 14 through a conduit 34, unseats a one-way air outlet check valve 36 and exits through outlet 32. Dry air from either tower 12, 14 is prevented from flowing completely through a conduit 38 by one-way, purge flow check valves 40 and 42.

A portion of the dry air (approximately 6 percent) that is sent to outlet 32 is diverted or purged through a conduit 44 by means of a purge adjusting valve 46. The amount of dry air passing through conduit 44 is monitored by a purge adjustment gauge 48 and controlled by a purge orifice assembly 50 so that the desired amount of dry air is diverted. Purged dry air exiting orifice assembly 50 controllably flows into either a first flow path formed by a conduit 52 or a second flow path formed by a bypass line 54. Conduit 52 includes a cooling flow isolation valve 56, an electric heater 58 and a pulse purge regeneration (PPR) control valve 60. Bypass line 52 includes a cooling flow bypass valve 62. Heater 58 is utilized to heat the diverted dry air in order to accelerate regeneration of the desiccant in the regeneration tower. Diverted heated air from conduit 52 or diverted unheated or cool air from bypass line 54 are delivered through conduit 64, and one-way check valve 42 and conduit 34 into the upper portion of tower 14. The diverted dry air then passes downwardly regenerating the desiccant in tower 14 and passes out the bottom thereof. The bottom of each tower 12, 14 is provided with a purge outlet valve, 66 and 68, respectively. When the purge outlet valves 66, 68 are open, air used for regeneration passes through muffled openings 72, 74 respectively.

In describing operation of the gas drying apparatus 10, it will be assumed that the tower 12 is initially in a drying phase and that tower 14 is in a regeneration phase. A typical cycle for drying and regeneration phases is 4 hours. At the 4 hour mark, the process reverses, i.e. tower 12 which was in a drying phase now goes into a regeneration phase and tower 14 which was in a regeneration phase now enters a drying phase.

In operation, with tower 12 in a drying phase, saturated air entering the system through inlet 26 passes through air inlet valve 22 which is opened by the control arrangement 27 and enters into the bottom of tower 12. Air inlet valve 24 is kept closed so that no saturated air flows through regeneration tower 14. Purge outlet valve 68 is also kept closed so that no saturated inlet air is exhausted therethrough. As all of the saturated inlet air passes upwardly through tower 12, the desiccant absorbs the moisture from the saturated air and introduces pressurized dry air into the conduit 20. The pressurized dry air unseats air outlet check valve 30 and acts on check valve 40 to keep it in a closed position. Check valve 36 prevents air flow through conduit 34 and tower 14. The majority of dry air then flows from the outlet 32 for use by tools or the like with a portion of the dry air being diverted or purged into conduit 44 as dictated by purge adjusting valve 46 and purge orifice assembly 50. Bypass valve 21 is held closed so that the diverted dry air flows into conduit 52 and through isolation valve 20 which is opened. The diverted dry air is then passed through heater 58 and PPR control valve 60 which is controllably opened so that the heated dry air is delivered into conduit 64. Heated dry air passes through check valve 36 and flows into the top of and downwardly through regeneration tower 14 thus regenerating the desiccant therein. Check valve 40 prevents diverted air from flowing to conduit 28. Diverted air flowing through regeneration tower 14 is exhausted to atmosphere by purge outlet valve 66 (which is held open throughout the cycle) and its muffled opening 72. In prior art systems, the purge outlet valve 66 or 68, as the case may be, was pulsed (i.e. alternately opened and closed) which caused a loud, annoying noise typically every 20 minutes.

In the present system, the PPR control valve 60 is pulsed on and off typically every 5 minutes during the first portion of the cycle until the heated air in tower 14 reaches a predetermined temperature, typically 250 degrees Fahrenheit, as sensed by temperature gauge 20. At this temperature limit, a sensing arrangement in the system will also operate to send a signal to cycle heater 58 on and off so as to maintain the desired temperature of the diverted air. The effect of pulsing the purged air will tend to shoot incremental amounts of pressurized, heated air at 100 psi into regeneration tower 14 to improve the efficiency of the regenerating operation. Further, cycling the heater 58 on and off conserves energy and reduces operating cost without impairing the regeneration.

At about 2½ hours into the cycle, the valves 56 and 60 are closed and heater 58 is shut off to begin an unheated flow of diverted air which will cool the desiccant and prepare the regeneration tower 14 for its alternate drying phase. Now, bypass valve 54 is opened, and diverted or purged unheated or cooled air flows from conduit 44 through bypass line 54, conduit 64 and check valve 42 into regeneration tower 14 so that its desiccant bed is cooled effectively to reduce purge loss. Cooling normally occurs during the last 1½ hours of the 4 hour cycle.

Immediately prior to each tower 12, 14 changing from a regeneration cycle to a drying cycle, a portion of the dry air which would normally exit outlet 32 is allowed to flow into the tower which is changing from a regeneration cycle to a drying cycle. While this is happening, the corresponding purge outlet valve for that tower is closed so that the tower is pressurized. This occurs immediately prior to the opening of the corresponding inlet valve for that tower and ensures that that tower will be at approximately the same pressure as the saturated air entering the bottom of the tower so that the desiccant is not disturbed by a rush of moisture-laden air.

It should be appreciated that the gas drying apparatus 10 of the present invention interrupts purge flow at the heater 58 in contrast with the prior art system which interrupted flow at the purge outlet valve 66 or 68. The pressurizing and depressurizing of the prior art system creates a momentary, loud noise. By stopping line pressure at the heater 58, the depressurizing noise is much lower allowing more cycles of hold/depressurize/purge while avoiding noisy escape of air. When used in combination with the heater 58, this reduces the time required to heat the regeneration bed. Cycling the heater 58 on and off reduces the consumption of electrical energy. Providing the bypass line 54 and bypass valve 62 and corresponding closure of valves 56 and 60 and shutoff of heater 58, cools the desiccant bed more effectively to further reduce purge loss.

While the invention has been described with reference to a preferred embodiment, those skilled in the art will appreciate that certain substitutions, alterations and omissions may be made without departing from the spirit thereof. Accordingly, the foregoing description is meant to be exemplary only and should not be deemed limitative on the scope of the invention set forth with the following claims.

We claim:

1. A gas drying apparatus having at least two desiccant-containing towers which alternately receive moisture-saturated air from an inlet to be dried during a drying phase, and then receive dry air during a regeneration phase to regenerate the desiccant which had previously adsorbed moisture from saturated air during the drying phase, the apparatus comprising:

an inlet valve for each of the towers for introducing saturated air under pressure into the tower during the drying phase and passing the saturated air over the desiccant so that the dry air exits the tower and is delivered to an outlet;

control means to alternately open and close each inlet valve so that only one of the towers receives the saturated air during predetermined drying phase;

purge adjusting valve means to divert a portion of the dry air exiting a first tower in a drying phase and to direct the portion of the dryer to a second tower in the regeneration phase, the portion of the diverted dry air flowing along one of two flow paths including a first flow path having an isolation valve, a heater and a pulse purge regeneration control valve for selectively enabling delivery of heated dry air to the second tower, and a second flow path which bypasses the first flow path and includes a bypass valve for selectively permitting delivery of unheated dry air to the second tower so as to cool the desiccant therein;

a temperature sensing arrangement associated with the second tower for monitoring internal temperature of heated dry air delivered into the second tower such that upon reaching a predetermined desired maximum temperature of the heated dry air into the second tower, the heater is selectively energized and de-energized to maintain that desired maximum temperature;

and a purge outlet valve for each of the towers for releasing the air used for regeneration of the desiccant from the tower being regenerated, each purge outlet valve being kept open by the control means during the entire regeneration phase, whereby the control means operates in a first condition to close the bypass valve, open the isolation valve and alternately open and close the pulse purge regeneration valve so as to shoot incremental amounts of diverted, heated dry air into the second tower, and operates in a second condition to close the pulse purge regeneration valve and isolation valve and de-energize the heater, and open the bypass valve so as to permit cooling of the desiccant in the second tower.

2. A method of drying gas in an apparatus having at least two desiccant-containing towers which alternately receive moisture-saturated air to be dried during a drying phase, and then receive dry air during a regeneration phase to regenerate the desiccant which had previously adsorbed moisture from saturated air during the drying phase, the method comprising the steps of;

introducing saturated air into one of the towers during the drying phase and passing the saturated air over the desiccant so that dry air exits the tower;

introducing a portion of the dry air from the one tower into the other of the towers during the regeneration phase of the other tower and passing the dry air over the desiccant which had previously adsorbed moisture during the drying phase so that the dry air adsorbs moisture from the desiccant and regenerates the desiccant, the portion of the dry air flowing along one of two flow paths including a first flow path having an isolation valve, a heater and a pulse purge regeneration control valve for selectively enabling delivery of heated dry air to the other tower, and a second flow path which bypasses the first flow path and includes a bypass valve for selectively permitting delivery of unheated dry air to the other tower so as to cool the desiccant therein;

supplying a control arrangement operable in a first condition to close the bypass valve, open the isolation valve and alternately open and close the pulse purge regeneration valve so as to shoot incremental amounts of diverted, heated dry air into the other tower, and operable in a second condition to close the pulse purge regeneration valve and isolation valve and de-energize the heater, and open the bypass valve so as to permit cooling of the desiccant in the other tower; and providing a sensing arrangement for monitoring internal temperature of heated dry air delivered to the other tower such that upon reaching a predetermined desired maximum temperature of the heated dry air in the other tower, the heater is selectively energized and de-energized to maintain the desired maximum temperature.

3. The method of claim 2, including the step of providing a purge outlet valve for each of the towers for releasing the air used for regeneration of the desiccant for the tower being regenerated, each purge outlet valve being kept open during the entire regeneration phase.

4. The method of claim 2, wherein the internal temperature of the heated dry air in the other tower is approximately 250 degrees Fahrenheit.

5. The method of claim 2, further comprising a step of using about 6 percent of the total dry air generated by the one tower for introduction into the other tower.

* * * * *